United States Patent
Tomlinson

[15] 3,670,479
[45] June 20, 1972

[54] MOMENTUM SLOT CENTRIFUGAL TYPE SEPARATOR

[72] Inventor: Lee H. Tomlinson, Schenectady, N.Y.
[73] Assignee: General Electric Company
[22] Filed: Dec. 14, 1970
[21] Appl. No.: 98,098

Related U.S. Application Data

[63] Continuation of Ser. No. 827,338, May 23, 1969, abandoned, and a continuation-in-part of Ser. No. 627,107, March 30, 1967, abandoned.

[52] U.S. Cl.................................................55/416, 55/457
[51] Int. Cl............................................................B01d 45/12
[58] Field of Search..................................55/447, 456, 457

[56] References Cited

UNITED STATES PATENTS

| | | | |
|---|---|---|---|
| 557,109 | 3/1896 | Cochrane | 55/224 |
| 767,721 | 8/1904 | Swartwout | 55/396 |
| 887,893 | 5/1908 | Wickstrum | 55/396 |
| 2,346,005 | 4/1944 | Bryson | 210/73 |
| 2,370,629 | 3/1945 | Appeldoorn | 65/451 |
| 2,413,324 | 12/1946 | Holzwarth | 55/452 |
| 2,487,633 | 11/1949 | Breslore, Jr | 55/416 |
| 2,538,195 | 1/1951 | Henkel | 55/450 |
| 3,360,908 | 1/1968 | Baily | 55/398 |
| 3,362,155 | 1/1968 | Driscoll | 60/39.09 |

*Primary Examiner*—Bernard Nozick
*Attorney*—Paul A. Frank, Richard R. Brainard, John F. Ahern, Julius J. Zaskalicky, Frank L. Neuhauser, Oscar B. Waddell and Joseph B. Forman

[57] ABSTRACT

The main passageway has an annular extraction passageway in the wall thereof. The upstream surface of the annular passageway is contoured so that any fluid entering the annular passageway continues with its momentum unaltered to the exit end thereof. Such a surface is formed by the revolution about the axis of the main passageway of a straight line which is coincident in direction with the momentum of an element of fluid as it enters the annular passageway.

3 Claims, 5 Drawing Figures

Inventor:
Lee H. Tomlinson,
by Julius Baskalicky
His Attorney.

MOMENTUM SLOT CENTRIFUGAL TYPE SEPARATOR

This application is a continuation-in-part of my copending application "Momomentum Slot Centrifugal Type Separator," Ser. No. 827,338 filed May 23, 1969 and Ser. No. 627,107 filed Mar. 30, 1967 both abandoned and assigned to the same assignee.

My invention relates to an improved separator, and more particularly to a centrifugal type phase or particle vortex separator having a momentum slot.

In the utilization of modern equipment, operation under conditions where two distinct phases are present and mixed together is a frequent occurrence. Often one needs to separate one of these phases from the other since its presence is undesirable for further operation. In many situations, it is advantageous to remove one phase without affecting the velocity or pressure of the remaining phase. This process becomes useful, for example, in the separation of moisture or particles from air as in the intake of jet engines or in the operation of nuclear power plants where separation of the two phases is required when the steam-water mixture leaves the reactor core. Separation in steam power plants may further be needed in the turbine due to moisture developed in the process of expansion within the turbine. If the separation in the reactor is not properly achieved, moisture reaches the steam turbine and causes reduction in cycle efficiency, turbine erosion, and may result in radioactive deposits in the turbine itself.

The present invention contemplates an improved separator wherein efficiency is high and velocity and pressure parameters are maintained the same at the inlet and outlet.

A principal object of the present invention is to provide an improved separation system usable in high velocity fluid flow systems.

Another object is to provide an improved separator which has low pressure loss over a wide range of fluid velocities.

Another object is to provide an improved separator which is compact.

Another object is to provide an improved separator which extracts with high degree of completeness one phase from another phase of a two phase fluid system.

A further object is to provide an improved separator having an annular extraction passageway which is contoured so that any fluid entering the annular passageway continues with its momentum unaltered to the exit end thereof.

The features of my invention which I desire to protect herein are pointed out with particularity in the appended claims. The invention itself, however, both as to its organization and method of operation together with further objects and advantages thereof may best be understood by reference to the following description taken in connection with the accompanying drawings wherein:

In accordance with an illustrative embodiment of my invention there is provided a main passageway having a substantially uniform diameter for receiving a stream of fluid having a dense and a light phase. An annular extracting opening having an upstream and a downstream edge is provided. A pair of annular walls are provided, each connected to a respective one of the annular edges and extending outward to form an annular passageway. Fluid swirling means are mounted in the main passageway upstream from the upstream edge of the opening to effect a separation of the dense and light phases of the fluid and provides a predetermined angle of swirl to the fluid flowing along the inside surface of the main passageway. The annular wall connected to the upstream edge is a surface formed by the revolution of a particular straight line about the axis of the main passageway. The particular straight line is one which extends from a point in the upstream edge outward through the wall of the main passageway and which lies in a plane which is tangent to the wall of the main passageway along a line thereof including the point. The particular straight line makes an angle with the aforementioned tangent line which is equal to the aforementioned predetermined angle of swirl.

Figure 1:
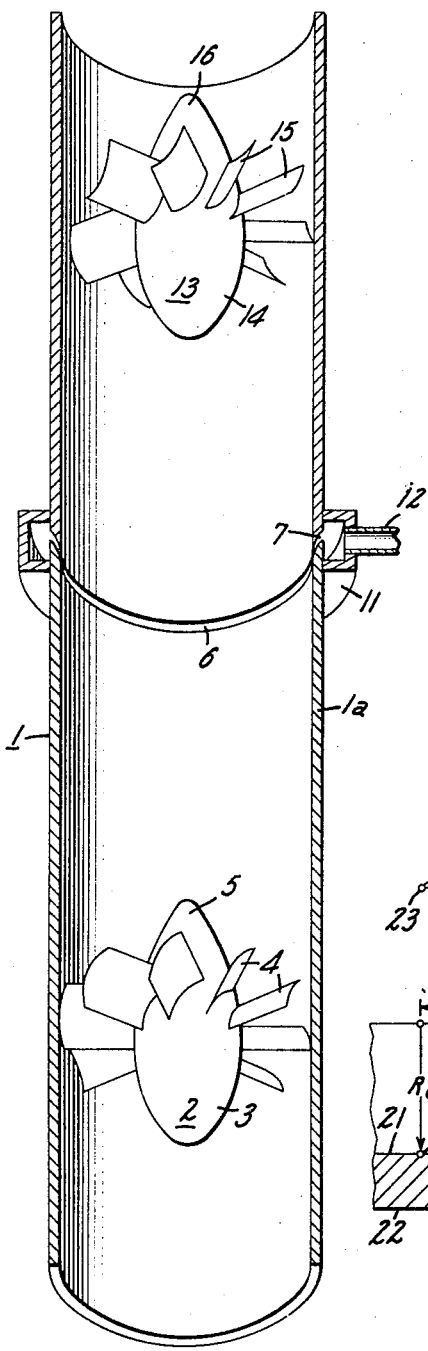
FIG. 1 is a sectional view of a vortex separator embodying the present invention.

In FIG. 1 is shown a sectional view of the axial flow separator embodying the present invention. The construction includes a hollow tube 1 having a wall 1a. The tube 1 has a uniform inside diameter to form a first or main passageway. Mounted near the inlet of the tube is a swirl vane assembly 2 which imparts a predetermined angle of swirl to fluid reaching the inside surface of the tube 1. The swirl vane assembly 2 comprises an aerodynamically shaped central hub 3 with blades 4 curved or arc shaped in cross section projecting from the side of the body or hub at the mid-section thereof. Swirl vane assembly 2 imparts a tangential component of velocity to the fluid entering the tube and passing therethrough. The blades of the swirl vane assembly projecting radially from the central hub 3 terminate at the inside surface of the wall 1a to which they are secured. The blades 4 may be secured by any known method such as by welding, brazing, riveting or by the use of nuts and bolts. At the root of each of the blades 4 where they are attached to the hub, each of the blades have a turning angle, i.e., the angular displacement between the tangent to inlet edge and the tangent to the outlet edge of a blade, which is greater than the turning angle at the point of attachment to the inside surface of the tube 1, i.e., at the tip thereof. The blades may be relatively thin in cross section as shown in FIG. 1 or may be aerodynamic in cross section. The curvature of each of the blades are the same. The blades are uniformly spaced circumferentially from one another. The concave surfaces of each of the blades face in the same direction which may be clockwise or counterclockwise.

The central hub 3 from which the blades project is shaped so that when the flow leaves the blades it encounters almost no resistance from the hub. The rearward part 5 of the hub also serves to gradually decelerate the axial component of the inlet flow. When the flow leaves the swirl vanes 4, it has both axial and tangential components.

As the axial inlet velocity is increased the tangential component is proportionately increased, and accordingly the angle of swirl of the fluid at the inside surface of the wall 1a remains substantially constant. The angle of swirl is defined as the arc tangent of the tangential to the axial component of fluid velocity at the inside surface of the wall 1a. The angle of swirl depends only on the structure of the swirl producing means, principally the turning angle of the blades 4 of the swirl vane assembly 2. Secondarily, the angle of swirl is dependent on structural factors such as spacing of the blades 4 from one another around the periphery of the hub 3 to which they are attached and the width of the blades 4 in the direction of the axis of the tube 1. It has been found advantageous to work with angles of swirl in the range of 20° to 35°. Such a range is adequate to achieve good separation without adding more tangential flow component than necessary to achieve good separation of the dense and light phases.

Figure 2:
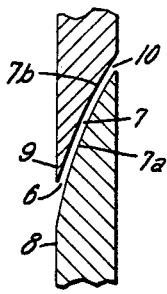
FIG. 2 is an enlarged section of the annular extraction passageway or momentum slot of FIG. 1.

Located downstream of the inlet swirl vane assembly 2 a suitable distance is an annular extraction port or opening 6, as shown in FIG. 2, having a leading edge 8 and a trailing edge 9 for bleeding off fluid which has been centrifuged or thrown by centrifugal force against the inside surface of wall 1a of tube 1. Each of annular edges 8 and 9 lie in respective planes. Each such plane being substantially perpendicular to the axis of the tube 1. A pair of spaced annular surfaces 7a and 7b are provided in the wall 1a of the tube extending from the entrance opening 6 to the exhaust opening 10 to form the annular passageway 7. The annular surface 7a connected to and including leading edge 8 extends to the outer surface of the wall 1a of the tube 1. The annular surface 7b connected to and including the lagging edge 9 also extends outward through the wall 1a to the outer surface of the wall 1a. Of course, the opening 6 is located a distance downstream from the swirl vane assembly 2 where substantially all of the denser phase of fluid has been centrifuged to the inside surface of wall 1a and is swirling therealong; however, the opening 6 is not located so far downstream where the angle of swirl has appreciably decreased. In operation, the momentum of the denser phase of fluid swirling along the inside surface of wall 1a carries the denser phase, for example, a liquid, with a very small amount of the lighter phase, for example, a gas, out of the tube 1 in a straight line path while the remainder of the lighter phase continues in its swirling path down the tube 1. The slot or passageway 7 is shaped so that it offers an unimpeded path of flow out of the tube 1 to the swirling fluid at the surface of the wall. The slot 7, referred to as a momentum slot is shown in enlarged cross section in FIG. 2. The surface 7a of the slot 7 connected to the upstream edge 8 of the opening 6 is a surface formed by the revolution of a straight line about the axis of the tube 1. The straight line would extend from a point on the upstream edge outward through the tube wall 1a. The straight line would lie in a plane tangent to the inside surface wall 1a along a line thereof including the point. The straight line, in addition, would make an angle with the tangent line or element of the inside surface of the wall 1a which is equal to the predetermined angle of swirl produced by the swirl vane assembly 2. When such a line is revolved about the axis of the tube, the surface of revolution produced is the surface 7a connected to the upstream edge 8. Preferably, the surface 7b connected to the downstream edge is similarly formed. The surfaces 7a and 7b of slot 7 are uniformly spaced to form a slot of relatively constant width as shown in FIG. 2 sufficient to pass the denser phase to be extracted. By use of slot 7 at high axial velocities, minimal light phase bleed along with the denser phase occurs yet high separation efficiency is achieved. High efficiencies are obtained with a lighter phase bleed on the order of 1 percent though sometimes slight gains in separation efficiency may be achieved by a little greater bleeding of the lighter phase. Surface 7b could be a surface which is congruent with surface 7a, i.e., if edge 9 were moved axially to coincide with edge 8, the surfaces 7a and 7b would coincide. Such an orientation produces a restricted opening in the slot 7 as represented by normals from points on edge 9 to the surface 7a. Such opening should of course be slightly larger than depth of the layer of the denser phase swirling on the inside surface of wall 1a to assure good separation of the denser phase with minimal bleed of the lighter phase. Both the leading edge 8 and trailing edge 9 of the slot entrance are part of the inner cylindrical surface of the tube 1. A section of surface 7a lying in a plane through the axis of tube 1 is a section of a hyperbola as will be described below in connection with FIGS. 3, 4 and 5. The diameter of edges 8 and 9 are identical and the same as the diameter of the tube 1. The planes of the edges 8 and 9 are perpendicular to the axis of the tube 1. The structure described presents a relatively smooth surface to the lighter phase flowing in the tube as such is relatively unimpeded by projections or discontinuities in its path.

Figure 5:
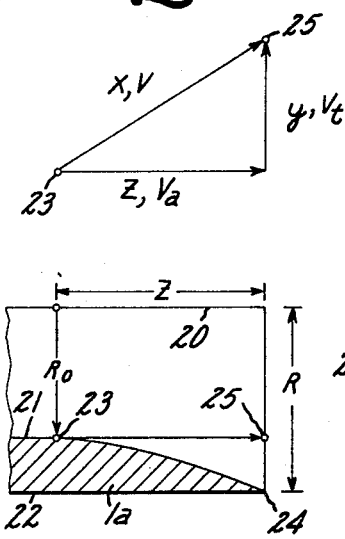
FIG. 5 is a plan view of particular line elements of FIGS. 3 and 4 useful in explaining the operation of the invention.
Figure 3:
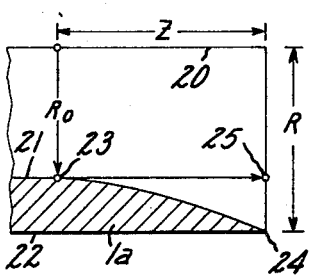
FIG. 3 represents a sectional view of one half of the main passageway or tube of FIG. 1 as viewed in a plane passing through the axis of the main passageway, showing the annular surface of the momentum slot which joins with the leading or upstream edge of entrance port thereof.
Figure 4:
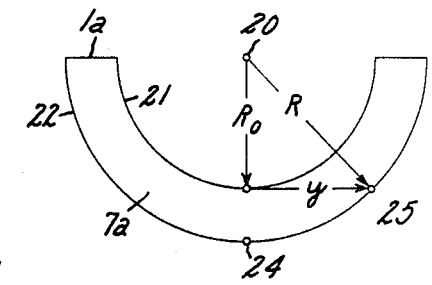
FIG. 4 is an end view of the section of the main passageway of FIG. 3.

Reference is now made to FIGS. 3, 4 and 5, for a determination of the radius R of a variable point on the annular surface 7a as a function of a distance Z along the axis of the tube 1. Each element in the FIGS. 3, 4 and 5 corresponding to an element in FIGS. 1 and 2 is designated by the same reference symbol.

Referring now particularly to FIG. 3 there is shown a side view in section of one half of the tube 1 or main passageway of FIG. 1 split by a horizontal plane through the axis of the tube. FIG. 3 for reasons of clarity is not shown to scale. The main passageway has an axis 20. The wall 1a of the main passageway has an inner surface 21 and an outer surface 22. The point 23 represents a point on the leading edge 8 of the annular surface 7a. The point 24 is located on an edge formed by the intersection of the annular surface 7a with the outer surface 22 of the wall 1a. The radius of the main passageway 1 is designated $R_0$. The radius of a variable point 25 on the annular surface 7a is designated R. For convenience, the variable point 25 is chosen as the point on the outer edge of the annular surface 7a which is the intersection of the annular surface 7a with the outer surface 22 of the wall 1a. An imaginary plane is passed through the point 23 and is made tangent to the inner surface 21 of the main passageway 1. Such a plane intersects the annular surface 7a in a straight line X which extends from point 23 on the leading edge 8 to a point 25 on the outer edge of the annular surface 7a. The component of the straight line X projected onto the plane of FIG. 3 is designated by the symbol Z. The line X extending from point 23 to point 25 is shown in FIG. 5, which is a plan view of certain elements of FIG. 3. The projection of line X into the plane of the view of FIG. 4, which is a side view of FIG. 3, is designated by the symbol Y.

As a result of the swirl produced in the denser phase of fluid flowing at the inner surface 21 of the wall 1a, an element of fluid at any particular point on the surface 21 has a certain velocity. At the point 23 the velocity of the element of fluid is represented by the vector V. The angle $\theta$ representing the angular displacement of the velocity vector V from the axis of the tube 1 is defined as the angle of swirl. $V_t$ is the tangential component of the velocity V and $V_a$ is the axial component of velocity V. The angle $\theta$ is the arc tangent $V_t/V_a$. The annular surface 7a is constituted so that the straight line X is coincident in direction with vector V. Accordingly, at the instant a quantity of fluid reaches the leading edge 8 of the surface 7a, it proceeds on its own momentum along the surface 7a unimpeded, that is in a straight line path. In effect, the layer of swirl fluid flowing on the inside surface 21 of wall 1a upon reaching the edge 8 continues flowing along the surface 7a without loss or change of momentum.

To determine the radius R of a point on the annular surface 7a for a predetermined distance Z along the axis of the passageway it will be necessary to determine R as a function of Z.

From FIG. 5 it is apparent that
$$Y = Z \tan \theta \qquad (1)$$
From FIG. 4, it is apparent that
$$R^2 = R_0^2 + Y^2 \qquad (2)$$
Accordingly, by substituting equation (1) in equation (2) and taking the square root it is apparent that
$$R = \sqrt{R_0^2 + (\tan\theta)^2 Z^2}$$

The latter relationship will be recognized as the equation for a hyperbola. Accordingly, for each axial point, a corresponding radius can be determined which will provide a resultant annular surface 7a in which the fluid which reaches the leading edge 8 of the annular surface 7a will escape of its own momentum, that is, in the direction indicated by the velocity vector of the element of fluid at that point. The resultant surface is formed by revolving the straight line X about the axis 20 of tube 1.

After the flow of the lighter phase in the tube passes the vicinity of the extraction port 6 it will come into contact with a deswirl vane assembly 13. The assembly 13 comprises a plurality of blades 15 which are placed on a central hub 14 similar to central hub 3 and having a rearward port 16. The purpose of the vane assembly 13 is to remove the tangential component of velocity imparted to the flow stream by the inlet swirl vanes 4 and return the flow to its original axial direction with a minimal loss of pressure. A collector 11 is mounted around the exhaust port 10 of the tube 1 to collect the heavier phase which passes through the slot. One or more pipes 12 conduct the heavier phase away from the collector 11. The extraction port 6 is located downstream at a point where the denser phase has been nearly completely centrifuged out of the main flow and is flowing along the wall. The port 6 will catch substantially all of the particular material or phase which it is desired to extract from the flow stream. The distance may vary a bit when the blades of inlet swirl vane assembly 2 are made variable and set to one particular angle or another. The rest of the flow stream passes by the momentum slot 7 and is the nonextracted portion of the lighter fluid flow. This ligher fluid flow is deswirled by the deswirl vane assembly 13 downstream of the momentum slot 7. There is little pressure loss between inlet and outlet of the tube 1. The mass and velocity may be slightly decreased by the extraction but this loss is kept low since only a small portion of the flow is extracted. The extraction port is narrow and drag is kept to a bare minimum. In this way annular slot 7 accomplishes a high percentage of removal with a minimum interference to the flowing stream.

When the blades of swirl vane assembly are made variable to vary the angle of swirl, the angle of swirl may be set for such angle for which the momentum slot is designed. Small departures of a few degrees in angular displacement from such optimum angle does not appreciably affect the efficacy, efficiency and effectiveness of the momentum slot in performing its intended function.

I claim:

1. An axial flow vortex separator comprising
   tubular means defining a first passageway having a substantially uniform diameter for receiving a stream of fluid having a dense and a light phase flowing in a direction parallel to the axis thereof,
   an annular extraction opening in said first passageway having an annular edge upstream and another annular edge downstream of said opening, each of said edges lying in respective planes, said planes being substantially perpendicular to the axis of said first passageway, said tubular means having a pair of annular surfaces, each annular surface including a respective one of said annular edges and extending outwardly through said tubular means to form therein a second passageway annular in form,
   fluid swirling means mounted in said tubular means upstream from said upstream edge of said opening for providing a predetermined angle of swirl to said stream of fluid flowing in said first passageway,
   the annular surface including said upstream edge being a hyperbolic surface formed by the revolution about the axis of said tubular means of a first straight line which extends from a point in said upstream edge outward through said tubular means, which lies in a plane which is tangent to the wall of said first passageway along a tangent line thereof from said point which is a second line, and which makes an angle with said second line which is equal to said predetermined angle of swirl.

2. The combination of claim 1 in which said fluid swirling means includes a plurality of vanes located at the same axial position in said passageway and circumferentially spaced from one another, each of said vanes having a predetermined turning angle to provide a predetermined angle of swirl to said stream of fluid flowing axially in said first passageway.

3. The combination of claim 1 in which is provided straightening means for returning said stream of fluid after it has passed beyond said annular extraction opening to substantially its original axial flow state.

* * * * *